United States Patent [19]

Ito

[11] Patent Number: 4,615,638
[45] Date of Patent: Oct. 7, 1986

[54] BALL JOINT

[75] Inventor: Eiichi Ito, Meerbusch, Fed. Rep. of Germany

[73] Assignee: TRW Ehrenreich GmbH & Co., KG, Dusseldorf, Fed. Rep. of Germany

[21] Appl. No.: 670,972

[22] Filed: Nov. 13, 1984

[30] Foreign Application Priority Data

Nov. 15, 1983 [DE]  Fed. Rep. of Germany ... 8332784[U]

[51] Int. Cl.$^4$ .......................... F16B 3/00; F16C 11/00; F16D 1/12
[52] U.S. Cl. .................................... 403/135; 403/133; 403/140; 384/203
[58] Field of Search .............. 403/140, 135, 122, 133; 384/206, 208, 203

[56] References Cited

U.S. PATENT DOCUMENTS

| | | | |
|---|---|---|---|
| 3,530,495 | 9/1970 | Kindel | 403/140 |
| 3,539,234 | 11/1970 | Rapata | 284/203 |
| 3,554,586 | 1/1971 | Cutler | 403/140 |
| 3,787,127 | 1/1974 | Cutler | 403/133 |
| 3,967,907 | 7/1976 | Schmidt | 403/133 |
| 4,286,363 | 9/1981 | Morin | 403/122 X |
| 4,318,627 | 3/1982 | Morin | 403/133 |
| 4,353,660 | 10/1982 | Parks | 403/135 |

FOREIGN PATENT DOCUMENTS

| | | | |
|---|---|---|---|
| 1932520 | 1/1971 | Fed. Rep. of Germany . | |
| 197805 | 4/1978 | France | 403/140 |
| 209088 | 4/1966 | Sweden | 403/133 |

*Primary Examiner*—Cornelius J. Husar
*Assistant Examiner*—Todd G. Williams
*Attorney, Agent, or Firm*—Yount & Tarolli

[57] ABSTRACT

The subject of the invention is a ball joint for motor vehicles with a bearing shell arranged between a joint housing and a ball head. The shell is provided at one end with elastically deformable ribs projecting from a stop surface. So that the ribs, after compensating for production tolerances, can absorb, in the elastically deformable zone, additional axial shock loads occurring in driving operation, it is proposed that the ribs be designed as square ribs, running radially, and separated by grooves from the stop surface adjoining their side walls, while the volume of each rib projecting above the stop surface, before mounting, is approximately equal to the free volume of the two grooves adjacent to it, so that the side walls of the grooves lying next to the stop surface act in the mounted condition as support walls for the elastically deformed ribs.

3 Claims, 9 Drawing Figures 4,615,638

BALL JOINT

BACKGROUND OF THE INVENTION

The subject of the invention is a ball joint for motor vehicles having a bearing shell arranged between a joint housing and a ball head, which shell is provided on one end side with elastically deformable elevations projecting from a stop surface.

From German Pat. No. 1,953,116 there is known a ball joint with a one-part joint shell which has, on an end surface, spaced apart from each other, tiny nibs or cam-like elevations having a height exceeding slightly the production tolerances of the joint, which are deformable by the clamping force of the end surface against a shoulder surface of the joint housing. These known elevations are for the purpose of compensating for the production tolerances of the joint parts, to prevent different motion of the ball joint.

From German Pat. No. 1,098,381, there is known a ball joint with a bearing shell which is corrugated at its end surface facing the joint housing. This corrugation is also intended to compensate for production tolerances of the joint parts, in order to prevent different motion of the ball joint.

Finally, from German Disclosure No. 1,932,520, there is known still another ball joint with a bearing shell which is provided, on its end surface facing the joint housing, with projections in the form of ring segments or cylindrical additions, to prevent a reduction of the preload upon wear, and at the same time to mitigate the influence of production tolerances.

Starting from this, the invention attacks the problem of designing the elevation, already known in the form of nibs, corrugations, ring segments or cylindrical additions, so that by an elastic deformation production tolerances of the joint parts can be compensated for, during assembly of the joint and at the same time as uniform as possible a bearing pressure and a definite tilting moment or moment of rotation can be set, without completely deforming the elevations plastically and removing their elasticity.

SUMMARY OF THE INVENTION

For the technical solution of this problem it is proposed that the elevations be designed as rectangularly shaped ribs extending radially, which are separated by grooves formed adjacent their walls and extending inward from the stop surface, and the ribs and grooves be dimensioned so that the volume of each rib extending above the stop surface, before mounting, is approximately equal to the free volume of the two grooves adjacent the rib, so that the side walls of the grooves adjacent the stop surface, in the assembled condition, act as support walls for the elastically deformed ribs.

In one practical form of execution, the volume of the ribs, before assembly, may lie one-third above and two-thirds below the level of the stop surface, so that the ribs, in the assembled condition, are still extend above the stop surface by about 10% of their elastically deformable volume.

In a ball joint designed according to this technical instruction, the ribs may be utilized in the known way to compensate for production tolerances of the joint housing during assembly. At the same time, a predetermined tilting moment and moment of rotation, depending on the particular need, may be set. Here, the grooves provided between the ribs and the stop surface serve to make possible the flow of the material of the ribs in the elastically deformable zone. When the volumes of the ribs and of the grooves assigned to them are dimensioned in the proposed way, the side walls of the ribs are deformed elastically during assembly and rib material flows into the grooves and abut the side walls, of the groove spring herein and produce a proportional spring characteristic. With this, the elasticity necessary for maintaining the set preload is retained.

Further details and advantages of the subject of the invention are given in the description which follows with reference to the respective drawings, in which one preferred form of execution of the ball joint designed according to the invention has been represented schematically.

DESCRIPTION OF PREFERRED EMBODIMENT

Figure 1:
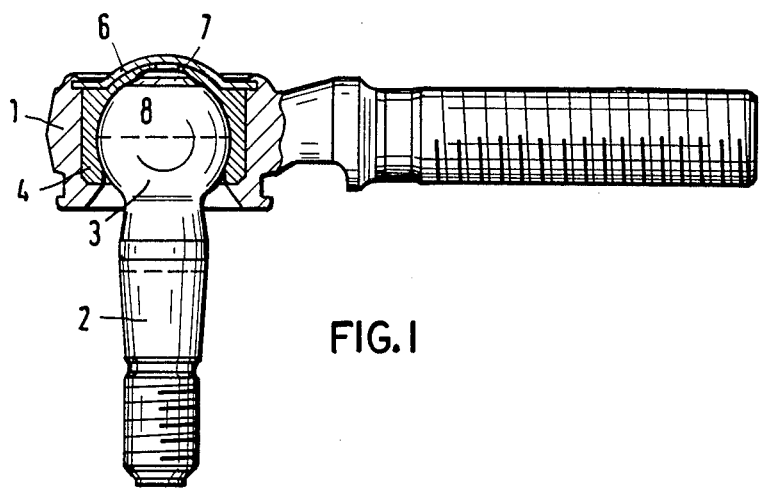
FIG. 1 shows a ball joint in the assembled condition, in longitudinal section.

In a joint housing 1 there is arranged a ball shank 2 with a ball head 3, with and interposed bearing shell 4 made of elastic material. At its upper side, the ball joint is closed with a rolled-in cap 6, under which lies a grease reservoir 7.

The bearing shell 4 may also consist of two semispherical bearing shell halves, which abut bluntly in the plane of the equator 8. The outer bearing shell would then be made of a hard elastic plastic, for example, polyoxymethylene. The bearing shell 4 lying inside consists, however, as a rule, of a soft elastic plastic, for example, polyurethane.

Figure 7:
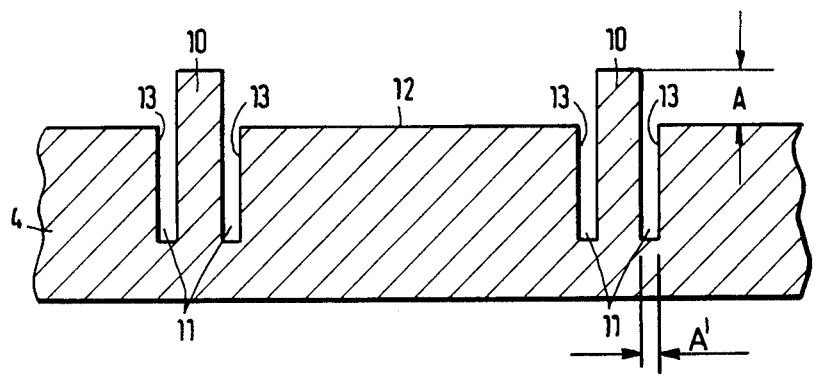
FIG. 7 shows a sectional developed view of the upper rim of the bearing shell taken along lines VII—VII of FIG. 3 before assembly to illustrate the ribs and grooves, on an enlarged scale.
Figure 8:
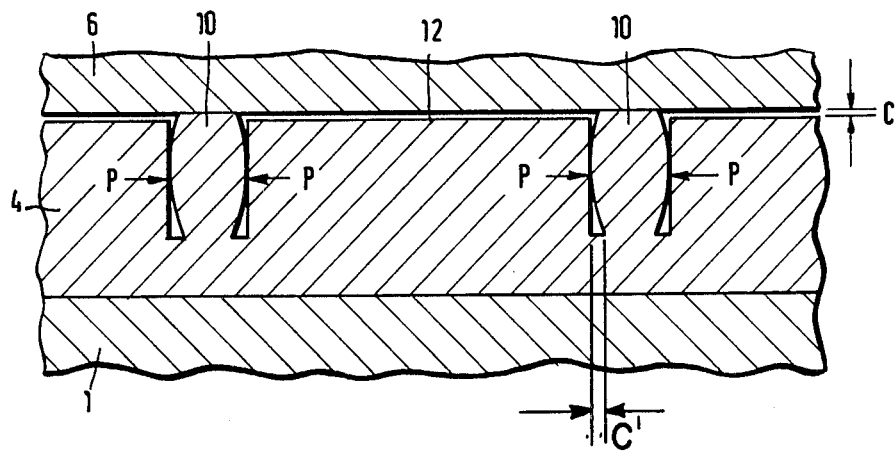
FIG. 8 shows a the same sectional developed view of the upper rim of the bearing shell after assembly of the joint to illustrate the elastic deformation of the ribs on an enlarged scale.

The bearing shell 4 is provided at its inner end surface 9 with ribs 10 extending radially, which are separated by grooves 11 from shorter and larger stop surfaces 12. The volumes of the ribs and the grooves are so selected to that in the unassembled condition (FIG. 7) about one-third of the rib 10 projects above the stop surface 12, and in the assembled condition (FIG. 8), almost completely fills the adjacent grooves 11.

Figure 2:
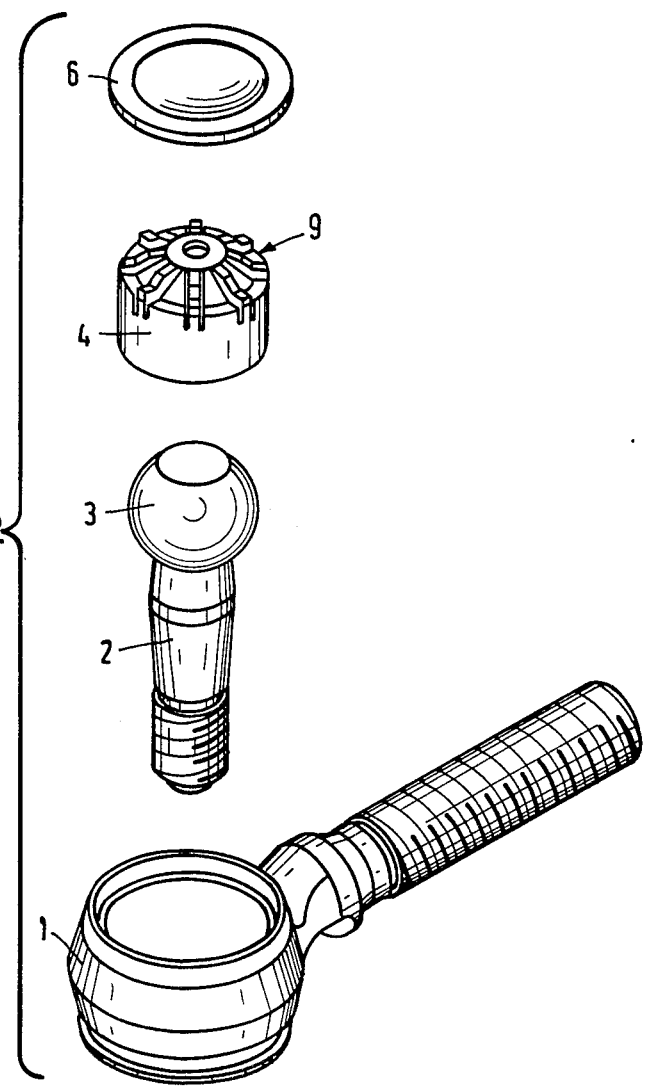
FIG. 2 shows an exploded diagram of the same ball joint.
Figure 3:
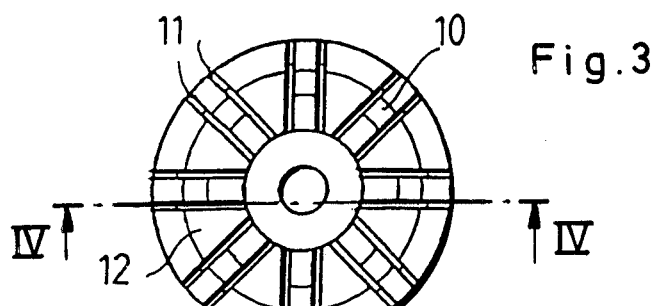
FIG. 3 shows a bearing shell with elastically deformable ribs, in top view.
Figure 4:
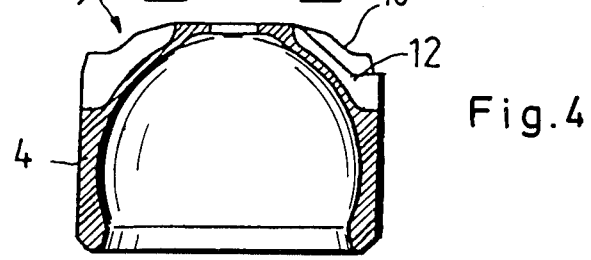
FIG. 4 shows the same bearing shell in section along the line IV—IV in FIG. 3.
Figure 5:
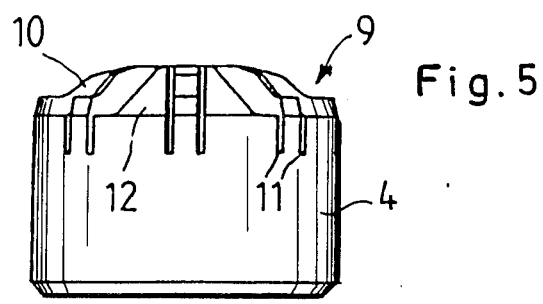
FIG. 5 shows the same bearing shell in side view.
Figure 6:
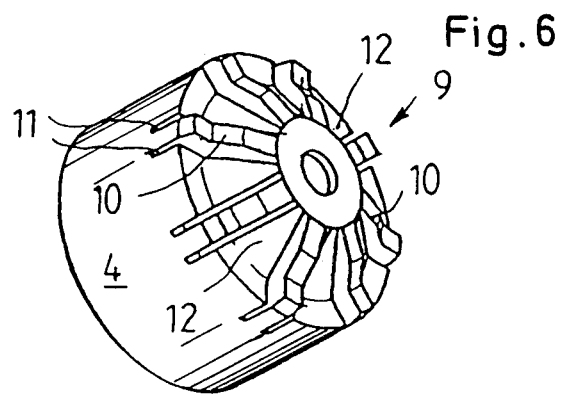
FIG. 6 shows the same bearing shell in perspective.
Figure 9:
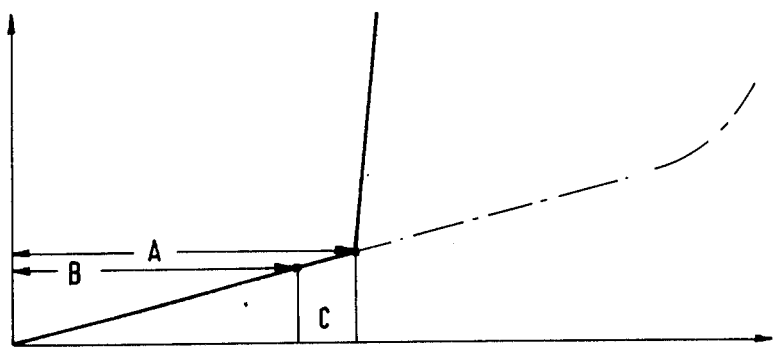
FIG. 9 shows a diagram with a spring characteristic for the bearing shell provided with the ribs and grooves.

When assembling of the ball joint, as has been shown in diagram in the exploded picture of FIG. 2, at first only the ribs 10 come in contact with the cap 6. With the rolling in of the cap 6, the ribs 10 are partially deformed elastically, to compensate for production tolerances of the joint housing 1, and to set the desired moment of tilting or rotation. With this, the ribs 10 are prestressed on the spring distance "B". Then the ribs 10 are supported against the side walls 13 of the grooves 11 with a support force "P". Only when the spring distance "C", still available for driving operation, is used up with great impact loads, the cap 6 abuts the stop surface 12, so that the spring characteristic (FIG. 9), after exhausting the total spring distance "A", rises steeply.

In a ball joint designed according to this technical instruction, a relatively great spring distance "B" is available for compensating for the production tolerances and, at the same time, without plastic deformation of the ribs 10, with further linear rising spring force, a spring distance "C" can be utilized, in order to absorb axial impact loads, before the total spring distance "A" is exhausted, and the stop surfaces 12 prevent a plastic deformation of the ribs 10. The width of the grooves "A'" is so chosen that it completely accomodates the spring distance "A" of the ribs. After spring distance "B" is exhausted, a volume "C'" of the grooves remains to provided for further compression of the ribs 10 corresponding to spring distance "C" of the ribs under the action of axial impact loads.

I claim:

1. A ball joint comprising:
   a housing having a cavity,
   a ball stud having a ball head disposed in said cavity in said housing and a shank portion projecting from said cavity,
   an elastically deformable bearing shell interposed between said ball head and said housing; and
   a cap for closing one end of said cavity and for exerting a preload pressure on said ball joint;
   said bearing shell having a stop surface thereon, a plurality of radial ribs projecting at least partially outwardly from said stop surface, and a pair of grooves each extending axially inwardly from said stop surface adjacent a respective one of opposite sides of each of said radial ribs, the volume of a portion of each rib projecting above said stop surface being approximately equal to the combined volume of said pair of grooves, whereby the elastically deformable material of said ribs flows into said grooves and resiliently abuts side walls thereof upon radial compression of said ribs by said cap, and said housing, having a portion to retain said bearing shell in said cavity.

2. A ball joint as defined in claim 1 wherein the volume of said portion projecting above said stop surface equals approximately one-third of the total volume of a rib and the volume of a portion of the rib extending beneath said stop surface is approximately two-thirds of the total volume of the rib.

3. A ball joint as defined in claim 2 wherein the volume of said portion projecting above said stop surface equals approximately ten percent of the total volume of the rib in the assembled condition of the ball joint.

* * * * *